(12) United States Patent
Trudeau et al.

(10) Patent No.: US 7,805,020 B2
(45) Date of Patent: Sep. 28, 2010

(54) MOTION COMPENSATED IMAGE REGISTRATION FOR OVERLAID/FUSED VIDEO

(75) Inventors: Tim K. Trudeau, Roanoke, VA (US); Jeff R. Lynam, Salem, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 1063 days.

(21) Appl. No.: 11/492,441

(22) Filed: Jul. 25, 2006

(65) Prior Publication Data

US 2008/0025640 A1 Jan. 31, 2008

(51) Int. Cl.
- G06K 9/32 (2006.01)
- G06K 9/36 (2006.01)
- G09G 5/00 (2006.01)
- H04N 9/74 (2006.01)
- H04N 7/18 (2006.01)
- G01P 3/36 (2006.01)
- G02F 1/01 (2006.01)
- H01L 31/00 (2006.01)

(52) U.S. Cl. .................. 382/284; 382/294; 382/103; 382/107; 345/629; 348/584; 348/154; 348/155; 356/27; 250/330

(58) Field of Classification Search .......... 382/284, 382/294, 103, 107; 345/629–641; 348/584–601, 348/154, 155; 356/27; 250/214, 330
See application file for complete search history.

(56) References Cited

U.S. PATENT DOCUMENTS

| | | | |
|---|---|---|---|
| 4,751,571 A | 6/1988 | Lillquist | |
| 4,837,632 A | 6/1989 | Kubo et al. | |
| 5,035,472 A | 7/1991 | Hansen | |
| 5,657,402 A * | 8/1997 | Bender et al. | 382/284 |
| 5,978,015 A * | 11/1999 | Ishibashi et al. | 348/47 |
| 6,788,823 B2 | 9/2004 | Allred et al. | |
| 6,798,578 B1 | 9/2004 | Beystrum et al. | |
| 2003/0202630 A1* | 10/2003 | Chen | 378/62 |
| 2004/0042086 A1 | 3/2004 | Beystrum et al. | |
| 2004/0105573 A1* | 6/2004 | Neumann et al. | 382/103 |
| 2006/0198558 A1* | 9/2006 | Riley et al. | 382/294 |
| 2007/0235634 A1* | 10/2007 | Ottney et al. | 250/214 VT |

* cited by examiner

Primary Examiner—Anand Bhatnagar
Assistant Examiner—Randolph Chu
(74) Attorney, Agent, or Firm—RatnerPrestia

(57) ABSTRACT

A system for compensating image misregistration between at least two image sensors includes a first image sensor and a second image sensor which are disposed on a platform and are configured to provide first and second output images, respectively. The system also includes a motion sensor and a processor. The motion sensor senses movement of the platform. The processor calculates a lag time between the first and second image sensors based on first and second processing delay times of the first and second image sensors, respectively. The processor also calculates an image offset based on the lag time and the movement of the platform sensed by the motion sensor and offsets one of the first or second output image with respect to the other one of the first or second output image based on the image offset. A fuser combines the offset image with the non-offset image.

21 Claims, 3 Drawing Sheets

MOTION COMPENSATED IMAGE REGISTRATION FOR OVERLAID/FUSED VIDEO

FIELD OF THE INVENTION

The present invention relates, in general, to video image fusion. More specifically, the present invention relates to an image fusion system and method for fusing images provided by multiple image sensors.

BACKGROUND OF THE INVENTION

The real time fusion of multi-sensor imagery is an important and growing area in image processing. An example of a system incorporating multiple sensors is the ITT Enhanced Night Vision Goggle (hereinafter "ENVG"). The ENVG is a head-borne night vision multi-spectral system which uses optical overlay fusion to fuse digital imagery from a thermal camera with imagery from a conventional direct-view light intensification tube. In the ENVG, the video imagery provided by the thermal sensor is presented digitally through an LCD display device and is overlaid onto the imagery from the intensification tube using a beam combiner.

Many fusion applications require that a sensor pair operate in a dynamic environment where, either the sensors are moving relative to the scene, or objects in the scene are moving relative to the sensors. In any real-time image fusion system, it is likely that a time lag disparity exists between the sensors in the video chains such that the time from input of photons to output of photons (or output of electrons) is not the same for every sensor. In the ENVG, for example, there is a time lag disparity between the output of a direct-view light intensification tube and the output of a thermal camera.

Any attempt to combine the video imagery from multiple sensors results in image mismatch or misregistration caused by the time lag disparity between the multiple input systems. If the disparity in one sensor is large compared to the video frame rate of a faster sensor, a noticeable separation between the multiple video images becomes apparent to the viewer whenever motion is present in the scene. In such a circumstance, one sensor is known to "lag" the other sensor. The amount of image mismatch depends directly on the severity of the sensor lag and the relative velocity between the camera's focal plane and the objects in the scene.

There exists a need for a system and a method for compensating image mismatch among video images provided by multiple video image sensors, in which the mismatch is caused by movement of the sensors and by time lag disparities introduced by the video image sensors.

SUMMARY OF THE INVENTION

An embodiment of the present invention is a system for compensating image misregistration between at least two image sensors. The system includes a first image sensor and a second image sensor which are disposed on a platform and are configured to provide first and second output images, respectively. The system also includes a motion sensor and a processor. The motion sensor senses movement of the platform, and the processor is configured to calculate an image offset based on the movement of the platform sensed by the motion sensor.

Another embodiment of the present invention is a method for compensating image misregistration between at least two image sensors. The method includes the steps of: (a) providing first and second image sensors disposed on a platform; (b) receiving from the first and second image sensors first and second output images, respectively; (c) sensing movement of the platform; and (d) offsetting the first or second output image received in step (b) based on the movement sensed in step (c) to provide an image offset.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

In any arrangement where an output of at least one sensor is processed through analog or digital circuits for display on an electronic display device, it is possible to shift the placement of the imagery on the display. For the purpose of co-registered image alignment, this shifting in the placement of the imagery is referred to herein as "image centering." If the spatial offset between the two or more images due to lag is calculated prior to the display of the images, it is possible to "re-center" one image with respect to the other. This re-centering is referred to herein as "motion compensated image registration." The re-centered images may then be fused or overlaid on the other images to produce a composite image for viewing by an observer.

Figure 1:
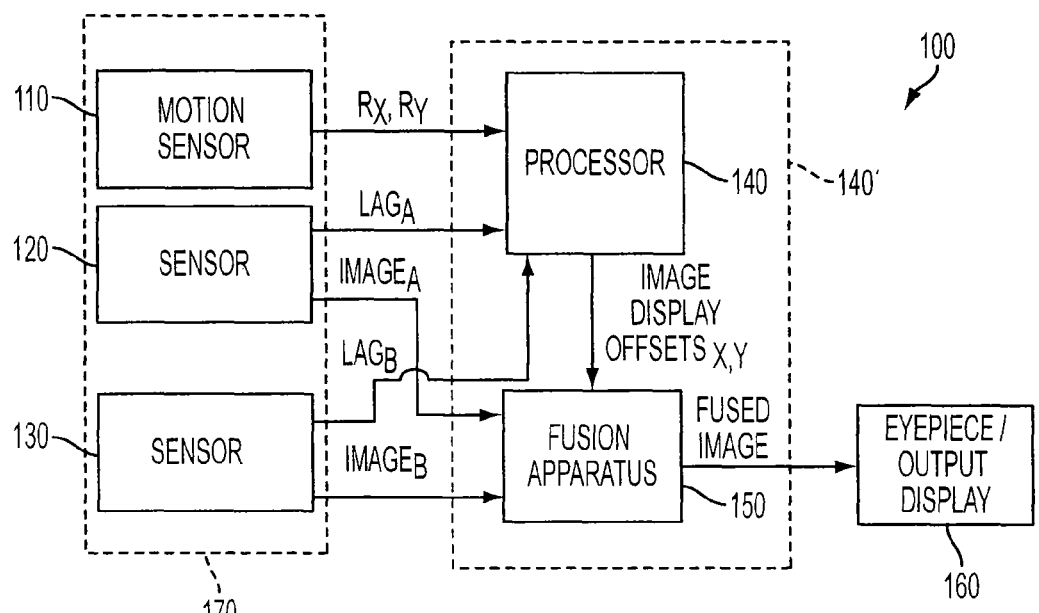
FIG. 1 illustrates a block diagram of a motion compensated image overlay system including an image fusion apparatus for fusing video imagery provided by image sensors, in accordance with an embodiment of the present invention.

As will be explained, the present invention provides a system and a method for correcting the fusion of images produced by multiple coaligned imaging sensors. Referring to FIG. 1, there is illustrated system 100 for compensating image misregistration between coaligned image sensors 120 and 130 according to an embodiment of the present invention. System 100 includes first image sensor 120 and second image sensor 130, both disposed on the same platform, or optical bench, generally designated as 170. First image sensor 120 is configured to provide a first output image designated as IMAGE$_A$. Second image sensor 130 is configured to provide a second output image designated as IMAGE$_B$. It is understood that IMAGE$_A$ and IMAGE$_B$ may be of any format, such as JPEG, PNG, GIF, bitmap, etc.

System 100 includes motion sensor 110 for sensing movement of platform or optical bench 170. As illustrated in FIG. 1, motion sensor 110 provides orthogonal rate outputs R$_X$ and R$_Y$ indicating movement of platform 170.

In one embodiment, motion sensor 110 may include two orthogonally oriented accelerometers that, respectively, sense horizontal and vertical linear accelerations of the optical bench. Motion sensor 110 may integrate the instantaneous accelerations over time. In this case, $R_X$ and $R_Y$ represent horizontal and vertical linear velocities of the optical bench. Alternatively, motion sensor 110 may provide the sensed horizontal and vertical linear accelerations of the optical bench to processor 140 which may then calculate the horizontal and vertical linear velocities of the optical bench by integration techniques.

In another embodiment, motion sensor 110 may include two-axis solid-state rate gyros, such as two ring laser gyros, which sense horizontal and vertical angular velocities of the optical bench. The outputs of motion sensor 110, $R_X$ and $R_Y$, then indicate the horizontal and vertical angular velocities respectively, of optical bench 170.

Referring next to image sensors 120 and 130, there is a delay between photons entering each image sensor and electrons (or photons) exiting each sensor. There is also a delay in the processing circuitry coupled to the sensor. The total delay (referred to herein as a "processing delay" or "lag time") is the result of the time required to sense the photons and process the sensed photons.

Different types of image sensors may have different lags. For example, in an optical image sensor, such as a lens system using direct-view magnification, the time between the input of photons and the output of photons is minimal, because the passage of light through such a sensor is virtually instantaneous. In an electronic image sensor, however, such as a CMOS or CCD image sensor, the lag is much greater and must be taken into consideration.

The lag introduced by a sensor has implications for fusing or overlaying images in which an object in the sensed images is moving, because the moving object is located at different pixel points on the output image of each sensor. The resulting images are, therefore, mismatched because of the relative lag, and fusing the output images results in a blurry object in the overlaid image.

More specifically, referring again to FIG. 1, each of image sensors 120 and 130 introduces a lag in its output image, $IMAGE_A$ and $IMAGE_B$, as a result of each sensor sensing and processing the image of a scene. In an exemplary embodiment, image sensors 120 and 130 provide first and second processing delay times (lag times), $Lag_A$ and $Lag_B$, which indicate the lags introduced by the respective image sensor. Image sensors 120 and 130 may calculate $Lag_A$ and $Lag_B$ if the lags are not constant. If the lags are constant, however, each image sensor may simply provide a preset or a preprogrammed lag value.

As shown, processor 140 receives $Lag_A$ and $Lag_B$ as input signals. In an alternative embodiment, the lags for image sensors 120 and 130 may be preprogrammed independently into processor 140. Processor 140 may be an ultra-low power micro-controller IC or may be embedded into an ASIC.

Processor 140 calculates the offset between $IMAGE_A$ and $IMAGE_B$ so that the output images of sensors 120 and 130 may be matched and combined (or fused). This offset is referred to herein as an "image offset." In order to calculate the image offset, processor 140 calculates the horizontal and vertical velocities of $IMAGE_A$ and/or $IMAGE_B$ based upon $R_X$ and $R_Y$. Using the horizontal and vertical velocities of $IMAGE_A$ and/or $IMAGE_B$ and $Lag_A$ and $Lag_B$, processor 140 calculates the image offset. The result is the vector, IMAGE DISPLAY OFFSETS$_{X,Y}$, which defines the number of pixels in the x- and y-directions by which $IMAGE_A$ or $IMAGE_B$ should be shifted to compensate for the misregistration caused by the lags and the movement of optical bench 170.

The lag time (or offset) between image sensors 120 and 130 may be expressed according to equation 1:

$$Lag_T = |Lag_A - Lag_B|, \quad (1)$$

where $Lag_A$ is the processing delay (or lag) of image sensor 120, $Lag_B$ is the processing delay (or lag) of image sensor 130, and $Lag_T$ is the lag between image sensor 120 and image sensor 130. When $Lag_A > Lag_B$, $IMAGE_A$ is said to lag $IMAGE_B$. Knowing the amount of time $IMAGE_A$ lags $IMAGE_B$ (or vice versa) allows system 100 to determine the number of pixels $IMAGE_A$ (or $IMAGE_B$) needs to be shifted or compensated to match $IMAGE_B$ (or $IMAGE_A$). Although the image with the greater lag is typically the image subject to compensation, it is contemplated within the scope of the invention that either or both output images may be shifted and re-centered to reduce or eliminate the misregistration.

Still referring to FIG. 1, fusion apparatus or fuser 150 receives $IMAGE_A$ from image sensor 120 and $IMAGE_B$ from image sensor 130. Using the calculated IMAGE DISPLAY OFFSETS$_{X,Y}$ fuser 150 fuses $IMAGE_A$ and $IMAGE_B$ to produce the FUSED IMAGE. More specifically, fusion apparatus 150 offsets (or re-centers) either $IMAGE_A$ or $IMAGE_B$ according to IMAGE DISPLAY OFFSETS$_{X,Y}$ to provide a re-centered image and then fuses the images. The resulting FUSED IMAGE is provided to eyepiece/output display 160 for viewing.

Although FIG. 1 illustrates two image sensors, it will be appreciated that the present invention is not limited to two image sensors; additional image sensors are contemplated within the scope of the invention. In a system with three or more image sensors, processor 140 may designate the lag time of one of the image sensors as a reference lag time and then offset the output images from the other image sensors based on their respective lag times.

It will be understood that although FIG. 1 illustrates a system for compensating image misregistration, the system may be constructed to compensate video misregistration. In such case, sensors 120 and 130 are video sensors and provide output videos in any known format.

Finally, although FIG. 1 illustrates processor 140 and fusion apparatus 150 as separate modules, it is contemplated within the scope of the present invention that processor 140 and fusion apparatus 150 may be housed in a single processor, such as processor 140', illustrated in dashed lines.

Figure 2:
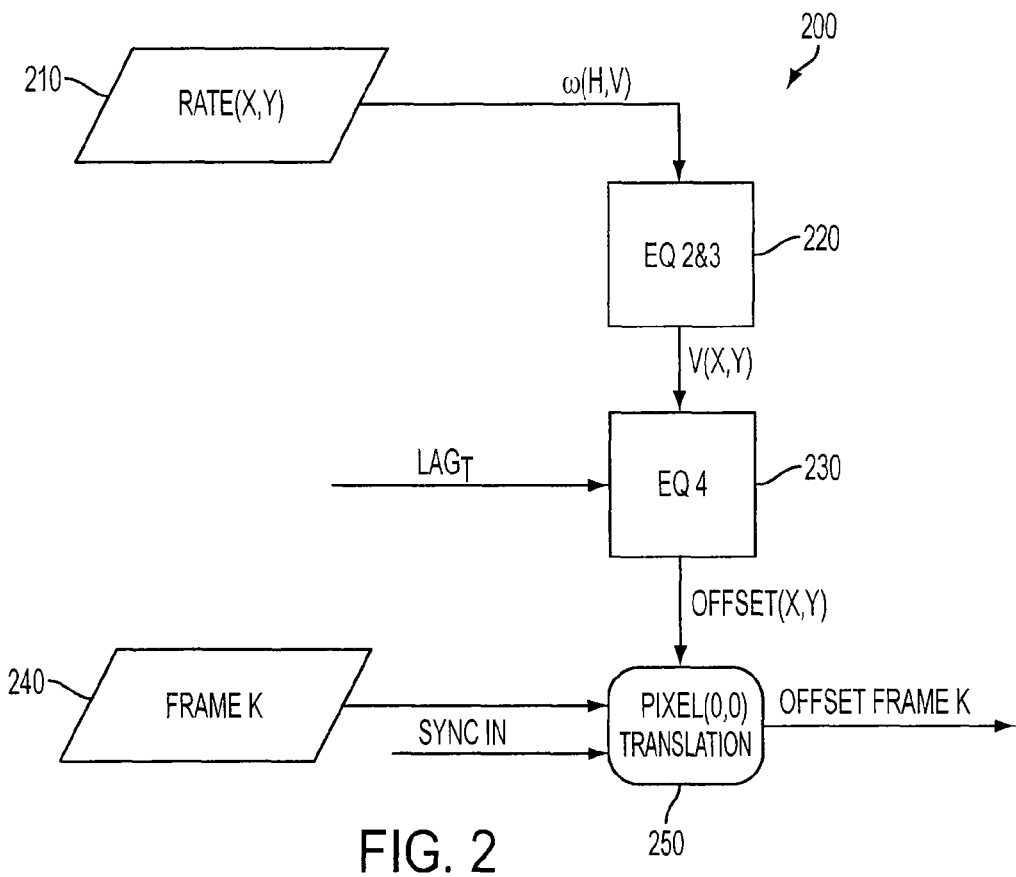
FIG. 2 illustrates a method for compensating image misregistration in accordance with an embodiment of the present invention.

Referring to FIG. 2, there is illustrated method 200 for compensating image misregistration between image sensors mounted on an optical bench (FIG. 1) according to an exemplary embodiment of the present invention. More specifically, method 200 describes the method by which a Frame K is offset to compensate for image mismatch caused by lag introduced by processing delays of the image sensors and by movement of the optical bench. In FIG. 2, $Lag_T$ describes the lag introduced by the image sensor providing Frame K in step 240. $Lag_T$ may also describe the relative lag between one image sensor and another image sensor. Method 200 is partially or entirely performed in processor 140 or 140' (FIG. 1).

In step 210, the angular rates of the optical bench are sensed by angular rate sensors and provided as outputs ω(h,v). The $\omega_h$ is an indication of the horizontal angular velocity of the optical bench. The $\omega_v$ is an indication of the vertical angular velocity of the optical bench.

The horizontal angular velocity, $\omega_h$, of the platform is converted in step 220 into a horizontal linear velocity, $\upsilon_x$, of Frame K in the (x,y) plane per equation 2:

$$v_x = \frac{\omega_h Cols}{FOV_h}, \quad (2)$$

where $\omega_h$ is the horizontal angular velocity of the platform, Cols is the number of pixels in a row of Frame K (i.e., the number of columns of pixels in Frame K), $FOV_h$ is the horizontal field of view (in radians) of the image sensor which provides Frame K, and $v_x$ is the calculated horizontal linear velocity of Frame K in pixels per second.

Similarly, the vertical angular velocity, $\omega_v$, of the platform is converted in step 220 into a vertical linear velocity, $v_y$, of Frame K in the (x,y) plane per equation 3:

$$v_y = \frac{\omega_v Rows}{FOV_v}, \quad (3)$$

where $\omega_v$ is the vertical angular velocity of the platform, Rows is the number of pixels in a column of Frame K (i.e., the number of rows of pixels in Frame K), $FOV_v$ is the vertical field of view (in radians) of the image sensor which provides Frame K, and $v_y$ is the calculated vertical linear velocity of Frame K in pixels per second.

Step 230 calculates horizontal and vertical image offsets, offset$_{x,y}$, for Frame K according to equation (4):

$$\text{offset}_{x,y} = v_{x,y} \text{Lag}_T, \quad (4)$$

where $v_{x,y}$ is a velocity vector of the horizontal and vertical linear velocities of Frame K (in pixels per second) calculated according to equations (2) and (3). The Lag$_T$ is the processing delay or lag (in seconds) of the image sensor which provides Frame K, or relative lag between one sensor and another sensor. The offset$_{x,y}$ is a vector of the calculated horizontal and vertical image offsets (in numbers of pixels) for Frame K. The horizontal and vertical image offsets determine the number of pixels in Frame K to be shifted or offset to compensate for image misregistration resulting from Lag$_T$ and the movement of the optical bench.

Retiming is performed in step 250 by adjusting the Frame K image provided in step 240 relative to the frame sync signal, Sync In. Pixel (0,0) and all subsequent pixels of the input Frame K are offset to a new pixel position (x,y) determined by offset$_{x,y}$, to yield an Offset Frame K.

Figure 3:
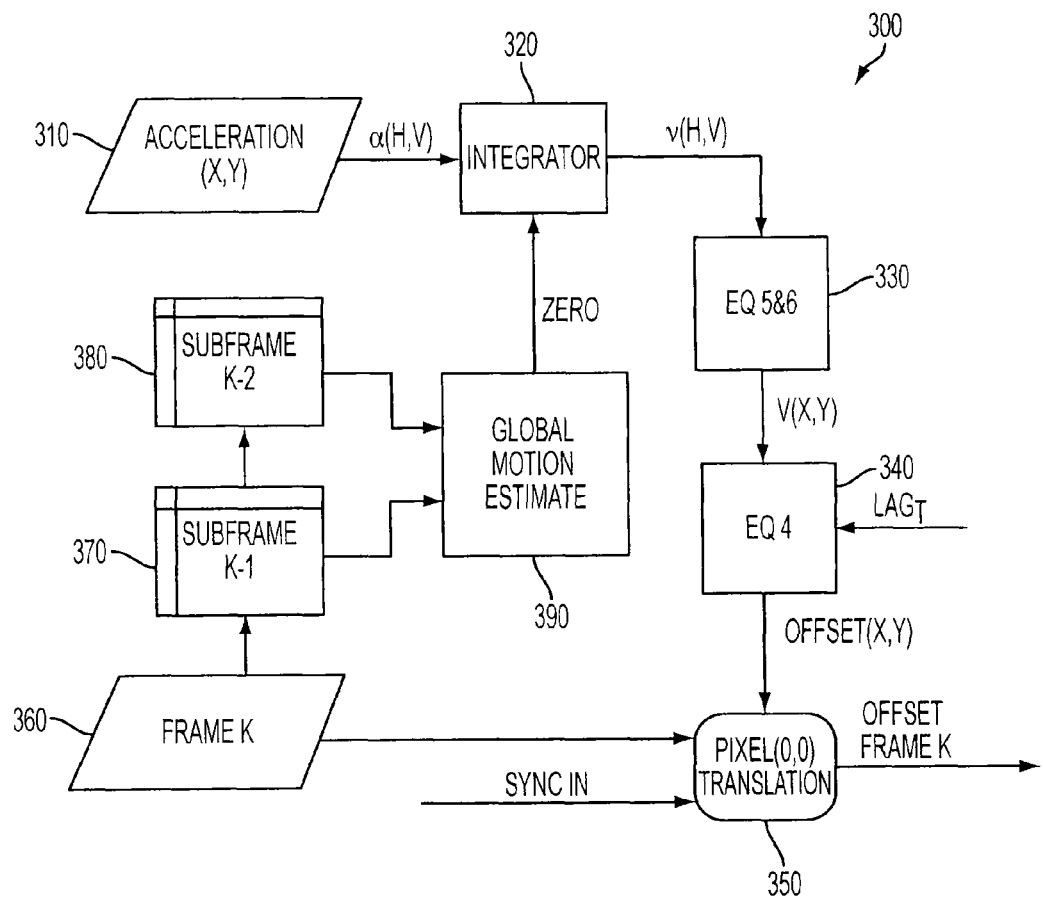
FIG. 3 illustrates a method for compensating image misregistration in accordance with an embodiment of the present invention.

Referring next to FIG. 3, there is illustrated method 300 for compensating image misregistration between image sensors mounted on an optical bench (FIG. 1) according to another exemplary embodiment of the present invention. Similar to method 200, method 300 describes the method in which Frame K is offset to compensate for image mismatch caused by lag introduced by processing delays of the image sensors and the movement of the optical bench. Method 300 differs from method 200 in that method 300 uses accelerometers to sense movement of the optical bench rather than angular rate sensors. Additionally, method 300 includes steps to calculate the horizontal and vertical linear velocities, $v(x,y)$, of Frame K, which are not performed in method 200.

In step 310, the horizontal and vertical accelerations of the optical bench, respectively $\alpha_h$ and $\alpha_v$, are sensed by accelerometers and provided as acceleration outputs $\alpha(h,v)$. In step 320, the accelerations $\alpha(h,v)$ are integrated over time to produce $v(h,v)$, the horizontal and vertical linear velocities of the optical bench.

Integrating instantaneous accelerations $\alpha(h,v)$ tends to accumulate error, resulting in progressively less accurate indications of the horizontal and vertical linear velocities of the optical bench. FIG. 3 illustrates exemplary method 300 which includes steps to reduce this error.

Steps 370 and 380 provide video image frames or subframes stored in multiple frame memories (not shown). Specifically, step 370 provides SubFrame K-1 stored in a first frame memory and step 380 provides SubFrame K-2 stored in a second frame memory. SubFrames K-1 and K-2 are frames or portions of frames of images sequentially provided by image sensor 120 or 130. The camera data in these two frames are separated in time by 1/FR, where FR is the camera frame rate of the image sensor.

Step 390 performs motion estimation in two dimensions between SubFrame K-1 and SubFrame K-2. If step 390 determines that both frames are spatially correlated to within a predetermined error limit, the velocity of SubFrame K-1 is assumed to be at or near zero. Step 390 then resets the integrator output $v(h,v)$ to zero. Since this approach uses camera data that is stale by up to two frame periods (K-2), a one frame latency is introduced into the error correction performed in step 320, but Frame K is not delayed.

Step 330 calculates horizontal and vertical linear velocities, $v(x,y)$, of Frame K in the (x,y) plane. The horizontal linear velocity of Frame K is calculated according to equation (5):

$$v_x = \frac{\left(\frac{v_h}{r} Cols\right)}{FOV_h}, \quad (5)$$

where $v_h$ is the horizontal linear velocity of the platform, r is the radial distance from the accelerometer to a pivot point of the platform (in radians), Cols is the number of pixels in a row of Frame K (i.e., the number of columns of pixels in Frame K), $FOV_h$ is the horizontal field of view (in radians) of the image sensor that provides Frame K, and $v_x$ is the calculated horizontal linear velocity of Frame K in pixels per second.

The vertical linear velocity of Frame K is calculated according to equation (6):

$$v_y = \frac{\left(\frac{v_v}{r} Rows\right)}{FOV_v}, \quad (6)$$

where $v_v$ is the vertical linear velocity of the platform, r is the radial distance from the accelerometer to a pivot point of the platform (in radians), Rows is the number of pixels in a column of Frame K (i.e., the number of rows of pixels in Frame K), $FOV_v$ is the vertical field of view (in radians) of the image sensor which provides Frame K, and $v_y$ is the calculated vertical linear velocity of Frame K in pixels per second.

Similar to FIG. 2, the image offsets, offset$_{x,y}$, are calculated according to equation (4) in step 340. Using offset$_{x,y}$ and Sync In, step 350 offsets Frame K and provides Offset Frame K as the result, similar to step 250 of FIG. 2.

Figure 4:
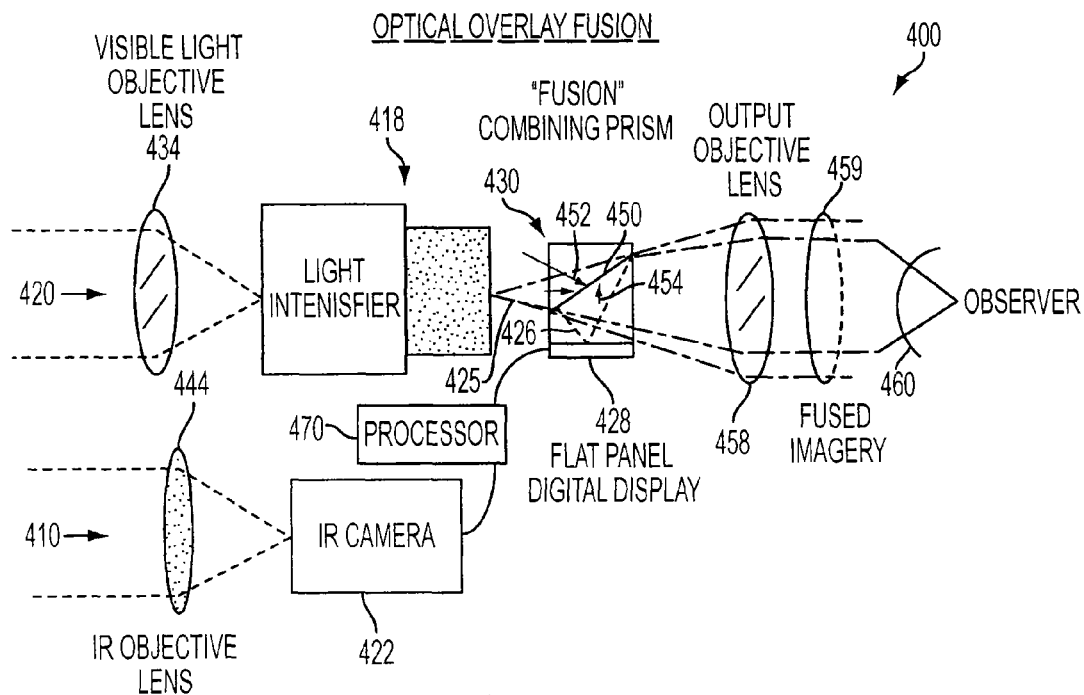
FIG. 4 illustrates a schematic diagram of the system of FIG. 1 where the fusion apparatus is an optical overlay fusion device and the image sensors include a direct-view light intensification tube and an IR camera.

Referring again to FIG. 1, system 100 performs optical fusion using fusion apparatus 150 in which one of image sensors 120 and 130 is a direct-view light intensification tube. FIG. 4 illustrates such an embodiment as system 400. System 400 performs optical overlay fusion of multi-spectral channels using prism 430 and flat panel display 428. System 400 includes sensor 418 for sensing scene image 420 in a first channel. Sensor 422 senses scene image 410 in a second channel. Preferably, scene image 420 is the same as scene image 410. Sensors 418 and 422 are mounted on an optical bench (not shown).

Sensor 418 is an image intensifier that uses a photo-cathode, a multi-channel plate (MCP), and a phosphor screen, for example. Visible and near infrared light is collected by objective lens 434 and focused onto the photo-cathode (not shown), where photons are converted into electrons. The electrons are accelerated through the MCP (not shown), creating new electrons in an amplification process. The multiplied electrons impinge on the phosphor screen (not shown) where luminescence occurs forming a beam 425, which is projected in direction 452 toward combining prism 430.

Sensor 422 is an infrared ("IR") camera which is used to convert infrared imagery into a visible image. IR camera 422 introduces a lag of 16 milliseconds between visible imagery 425 and the IR output imagery. Without compensating for this lag, the observer would see the IR image lagging behind the visible light image provided by image intensifier 418.

To compensate for the lag introduced by the processing delay of IR camera 422, system 400 includes processor 470 for re-centering the output image of IR camera 422. Processor 470 generally performs the steps illustrated in FIG. 2 or 3, depending on the type of sensor mounted to the optical bench. Processor 470 re-centers the output image of IR camera 422 based on the sensed movement of the optical bench and the lag between image intensifier 418 and IR camera 422. Processor 470 provides the compensated image to flat panel digital display 428 to eventually be combined with the uncompensated image from image intensifier 418 by combining prism 430 to form beam 426.

Combining prism 430 allows two optical channels to be combined. Using dichroic coating 450 that permits 70% of the incident radiation to be transmitted and 30% to be reflected, two perpendicular optical paths are combined. Output 425 of image intensifier 418 is positioned adjacent to beam combining prism 430 and is oriented perpendicular to optical path 454.

The two beams 425 and 426 are projected as images onto combining prism 430, which combines the images and provides a combined (fused) overlay image 459. An optical lens 458 focuses combined image 459 for observation by observer 460.

Figure 5:
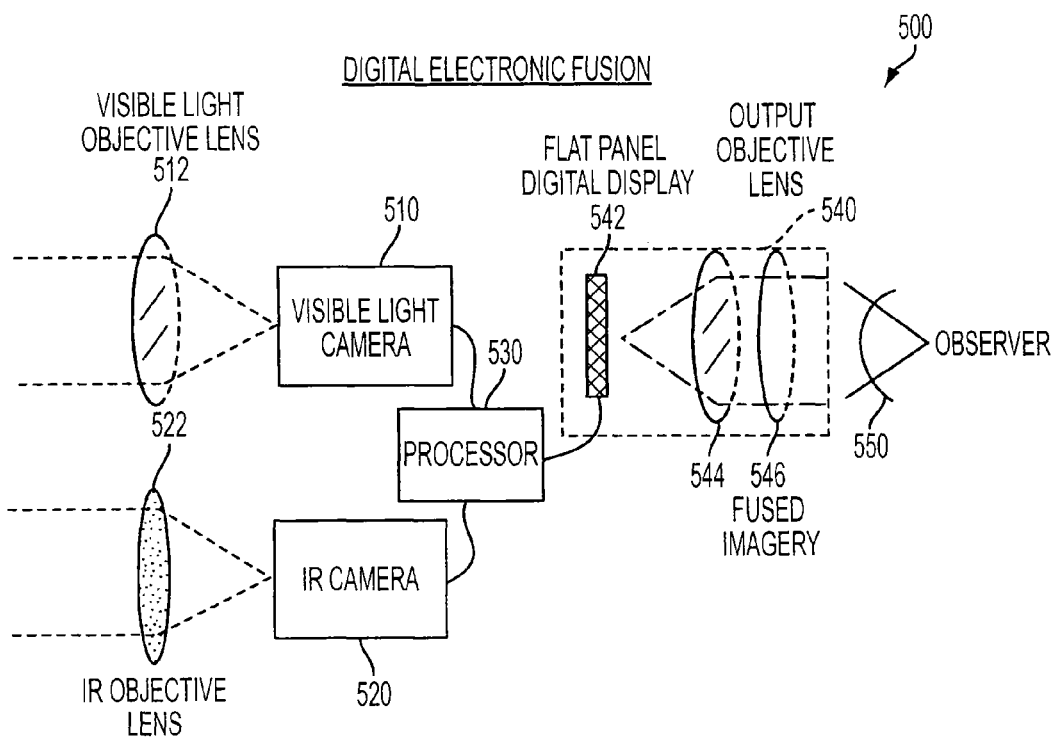
FIG. 5 illustrates a schematic diagram of the system of FIG. 1 where the fusion apparatus is an electronic video image fusion device and the image sensors include a visible light camera and an IR camera.

Referring lastly to FIG. 5, there is illustrated system 500 for compensating image misregistration between visible light camera 510 and IR camera 520, according to another exemplary embodiment of the present invention. Visible light objective lens 512 gathers light from the scene and passes the visible light to camera 510. Similarly, IR objective lens 522 gathers IR light from the scene and passes the IR light to IR camera 520. Visible light camera 510 provides a first output image and a first lag time indication (not shown) to processor 530. IR camera 520 provides a second output image and a second lag time indication (not shown) to processor 530. Both cameras 510 and 520 are mounted on an optical bench, which includes motion sensors.

Processor 530 offsets either the first or second output image based on the first or second lag time and the movement sensed by the movement sensors using method 200 or 300. Processor 530, which includes fusion electronics, fuses the offset image with the output image that was not offset, providing the resultant fused image to flat panel display 542 as fused image 546. Output objective lens 544 projects fused image 546 for viewing by observer 550. The combination of flat panel display 542 and output objective lens 544 may be housed in eyepiece 540.

In an exemplary embodiment, it is assumed that observer 550 is a human observer. In another embodiment fused imagery 546 may be presented for additional electronic or optical processing for eventual frame storage.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A system for compensating image misregistration between at least two image sensors comprising:
   first and second image sensors disposed on a platform and configured to provide first and second output images, respectively;
   a motion sensor for sensing movement of the platform; and
   a processor configured to calculate an image offset based on the movement of the platform sensed by the motion sensor;
   wherein the image offset is calculated by determining (a) horizontal and vertical velocities of the platform, and (b) processing delay time between the first and second output images, and
   the processor provides a vector defining a number of pixels in horizontal rows and vertical columns by which the first and second output images are shifted to compensate for the image misregistration between the first and second output images;
   wherein the processor is configured to calculate horizontal and vertical image offsets using the following equation:

$$\text{offset}_{x,y} = \upsilon_{x,y} \text{Lag}_T,$$

where:
   $\upsilon_{x,y}$ is a velocity vector of the horizontal and vertical linear velocities,
   $\text{Lag}_T$ is the lag time, and
   $\text{offset}_{x,y}$ is a vector of the calculated horizontal and vertical image offsets.

2. The system according to claim 1 including an image fuser,
   wherein the processor is configured to (i) calculate the image offset further based on the lag time and (ii) offset one of the first or second output image with respect to the other one of the first or second output image based on the image offset, and
   the fuser is configured to fuse the first and second output images based on the image offset.

3. The system according to claim 1, wherein the processor is configured to calculate horizontal and vertical linear velocities in a plane of the first or second output image based on the sensed movement.

4. The system according to claim 1 including an image fuser configured to fuse the first and second output images, after offsetting the first or second output image.

5. The system according to claim 4, wherein a synchronization signal is provided to the image fuser as a time reference between the first and second output images.

6. The system according to claim 1, wherein the processor is configured to calculate a vertical linear velocity of the first or second output image, using the following equation:

$$v_y = \frac{\omega_v \text{Rows}}{FOV_v},$$

where: $\omega_v$ is a vertical angular velocity of the platform,
Rows is a number of pixels in a column of the first or second output image,
$FOV_v$ is a vertical field of view of the first or second image sensor, and
$v_y$ is the calculated vertical linear velocity of the first or second output image.

7. A system for compensating image misregistration between at least two image sensors comprising:
first and second image sensors disposed on a platform and configured to provide first and second output images, respectively;
a motion sensor for sensing movement of the platform;
a processor configured to calculate an image offset based on the movement of the platform sensed by the motion sensor;
the motion sensor includes an accelerometer configured to sense horizontal and vertical linear accelerations of the platform; and
an integrator for integrating over time the horizontal and vertical linear accelerations to provide respective horizontal and vertical linear velocities of the platform; and
first and second frame memories configured to store respective first and second previous frames of the first or second output image, and wherein the processor is configured to zero the integrator when the processor determines that the first and second previous frames are spatially correlated to within an error limit.

8. The system according to claim 7 wherein the processor is configured to calculate horizontal and vertical linear velocities of the first or second output image based on the horizontal and vertical linear velocities of the platform.

9. The system according to claim 7, wherein the processor is configured to calculate the horizontal linear velocity of the first or second output image using the following equation:

$$v_x = \frac{\left(\frac{v_h}{r} \text{Cols}\right)}{FOV_h},$$

where:
$v_h$ is the horizontal linear velocity of the platform,
r is a radial distance from the accelerometer to a pivot point of the platform,
Cols is a number of pixels in a row of the first or second output image,
$FOV_h$ is a horizontal field of view of the first or second image sensor, and
$v_x$ is the horizontal linear velocity of the first or second output image.

10. The system according to claim 7, wherein the processor is configured to calculate the vertical linear velocity of the first or second output image using the following equation:

$$v_y = \frac{\left(\frac{v_v}{r} \text{Rows}\right)}{FOV_v},$$

where:
$v_v$ is the vertical linear velocity of the platform,
r is a radial distance from the accelerometer to a pivot point of the platform,
Rows is a number of pixels in a column of the first or second output image,
$FOV_v$ is a vertical field of view of the first or second image sensor, and
$v_y$ is the vertical linear velocity of the first or second output image.

11. The system according to claim 7, wherein the first image sensor includes an optical system configured to provide the first output image, and
the second image sensor includes an electronic image sensor configured to provide the second output image.

12. The system according to claim 11 including an image fuser comprising a digital display and a combining prism, wherein:
the optical system is configured to project onto the combining prism the first output image,
the digital display is configured to project onto the combining prism a light image based upon the second output image, the image offset, and the lag time, and
the combining prism is configured to fuse the first image with the projected light image.

13. A system for compensating image misregistration between at least two image sensors comprising:
first and second image sensors disposed on a platform and configured to provide first and second output images, respectively;
a motion sensor for sensing movement of the platform; and
a processor configured to calculate an image offset based on the movement of the platform sensed by the motion sensor;
wherein the motion sensor includes a rate sensor configured to sense angular velocities of the platform, and
the processor is configured to calculate a horizontal linear velocity of the first or second output image, using the following equation:

$$v_x = \frac{\omega_h \text{Cols}}{FOV_h},$$

where:
$\omega_h$ is a horizontal angular velocity of the platform,
Cols is a number of pixels in a row of the first or second output image,
$FOV_h$ is a horizontal field of view of the first or second image sensor, and
$v_x$ is the calculated horizontal linear velocity of the first or second output image.

14. The system according to claim 13, wherein the first and second image sensors include, respectively, first and second processing delay times, and
the processor is configured to calculate a lag time between the first and second image sensors based on the first and second processing delay times.

15. The system according to claim 14 including an image fuser,
wherein the processor is configured to (i) calculate the image offset further based on the lag time and (ii) offset one of the first or second output image with respect to the other one of the first or second output image based on the image offset, and
the fuser is configured to fuse the first and second output images based on the image offset.

16. The system according to claim 14, wherein the processor is configured to calculate horizontal and vertical linear velocities in a plane of the first or second output image based on the sensed movement.

17. The system according to claim 16, wherein the processor is configured to offset the first or second output image based on the calculated horizontal and vertical linear velocities.

18. The system according to claim 17 including an image fuser configured to fuse the first and second output images, after offsetting the first or second output image.

19. The system according to claim 18, wherein a synchronization signal is provided to the image fuser as a time reference between the first and second output images.

20. The system according to claim 13, wherein the processor is configured to calculate a vertical linear velocity of the first or second output image, using the following equation:

$$v_y = \frac{\omega_v \text{Rows}}{FOV_v},$$

where:
$\omega_v$ is a vertical angular velocity of the platform,
Rows is a number of pixels in a column of the first or second output image,
$FOV_v$ is a vertical field of view of the first or second image sensor, and
$v_y$ is the calculated vertical linear velocity of the first or second output image.

21. The system according to claim 13, wherein the processor is configured to calculate horizontal and vertical image offsets using the following equation:

$$\text{offset}_{x,y} = v_{x,y} \text{Lag}_T,$$

where:
$v_{x,y}$ is a velocity vector of the horizontal and vertical linear velocities,
$\text{Lag}_T$ is the lag time, and
$\text{offset}_{x,y}$ is a vector of the calculated horizontal and vertical image offsets.

* * * * *